(12) United States Patent
Seo (10) Patent No.: US 7,508,415 B2
(45) Date of Patent: Mar. 24, 2009

(54) METHOD FOR CONTROLLING MASKING BLOCK IN MONITORING CAMERA

(75) Inventor: Sung Ha Seo, Suwon-si (KR)

(73) Assignee: LG Electronics Inc., Seoul (KR)

( * ) Notice: Subject to any disclaimer, the term of this patent is extended or adjusted under 35 U.S.C. 154(b) by 651 days.

(21) Appl. No.: 10/992,083

(22) Filed: Nov. 19, 2004

(65) Prior Publication Data

US 2005/0117023 A1 Jun. 2, 2005

(30) Foreign Application Priority Data

Nov. 20, 2003 (KR) ...................... 10-2003-0082495

(51) Int. Cl.
*H04N 7/18* (2006.01)
*H04N 9/47* (2006.01)
*G06K 9/00* (2006.01)
*G06K 9/20* (2006.01)
*G06K 9/36* (2006.01)

(52) U.S. Cl. .................... 348/208.3; 348/137; 348/170; 348/143; 348/208.14; 382/103; 382/283

(58) Field of Classification Search ................. 348/143, 348/231.6
See application file for complete search history.

(56) References Cited

U.S. PATENT DOCUMENTS 6,744,461 B1 * 6/2004 Wada et al. ................. 348/143
6,765,608 B1 7/2004 Himeda et al. ........... 348/211.5

2003/0227555 A1 * 12/2003 Kobayashi et al. ....... 348/231.6

FOREIGN PATENT DOCUMENTS

| DE | 101 58 990 | 4/2003 |
|---|---|---|
| EP | 1 081 955 | 3/2001 |
| JP | 2000-261789 | 9/2000 |
| JP | 2000-278584 | 10/2000 |
| JP | 2001-069494 | 3/2001 |

OTHER PUBLICATIONS

Chinese Office Action dated Dec. 8, 2006.
Korean Office Action dated Aug. 26, 2005.
European Search Report dated Feb. 23, 2005.

* cited by examiner

*Primary Examiner*—Ngoc-Yen T Vu
*Assistant Examiner*—Chia-Wei A Chen
(74) *Attorney, Agent, or Firm*—Ked & Associates LLP (57) ABSTRACT

A method for controlling a masking block in a monitoring camera. The method adjusts the masking block to precisely hide an image of a subject with its position and size changed when a zoom magnification is changed under a state where the masking block is set. In addition, the method adjusts a masking block to precisely hide a changed image of a subject when the monitoring camera is rotated to change the position of the image of the subject. In addition, the method measures and corrects a distance between a center axis of a CCD and an optical axis of a lens if the two axes are not coincident with each other. In addition, the method corrects an offset occurring due to an incorrect coupling between the monitor camera and a pan/tilter. Furthermore, a method for setting a masking block when a remotely uncontrollable monitoring camera is used is disclosed.

15 Claims, 11 Drawing Sheets

When optical axis is coincident with center axis of CCD

When optical axis is not coincident with center axis of CCD

When monitoring camera is correctly mounted on pan/tilter

When monitoring camera is not correctly mounted on pan/tilter

METHOD FOR CONTROLLING MASKING BLOCK IN MONITORING CAMERA

BACKGROUND OF THE INVENTION

1. Field of the Invention

The present invention relates to a method for controlling a masking block overlapped to prevent a particular subject requiring privacy protection from being exposed.

2. Description of the Related Art

Recently, with a digital video recorder (DVR) in common use, a monitoring camera installed at a place requiring security takes a photograph of a subject to be monitored and image data of the photographed subject can be stored in the DVR. However, since an image of the subject photographed by the monitoring camera can also include faces of unspecified individuals, denunciation on privacy infringement is being raised.

For the purpose of protecting privacies of the unspecified individuals, there has been proposed a method for displaying a masking block such as a mosaic image in an overlapped way. This method is a method for overlapping an image including the masking block for hiding only a subject with privacy to be protected with the image of the subject to be monitored (hereinafter referred to as "monitor image").

Figure 1:
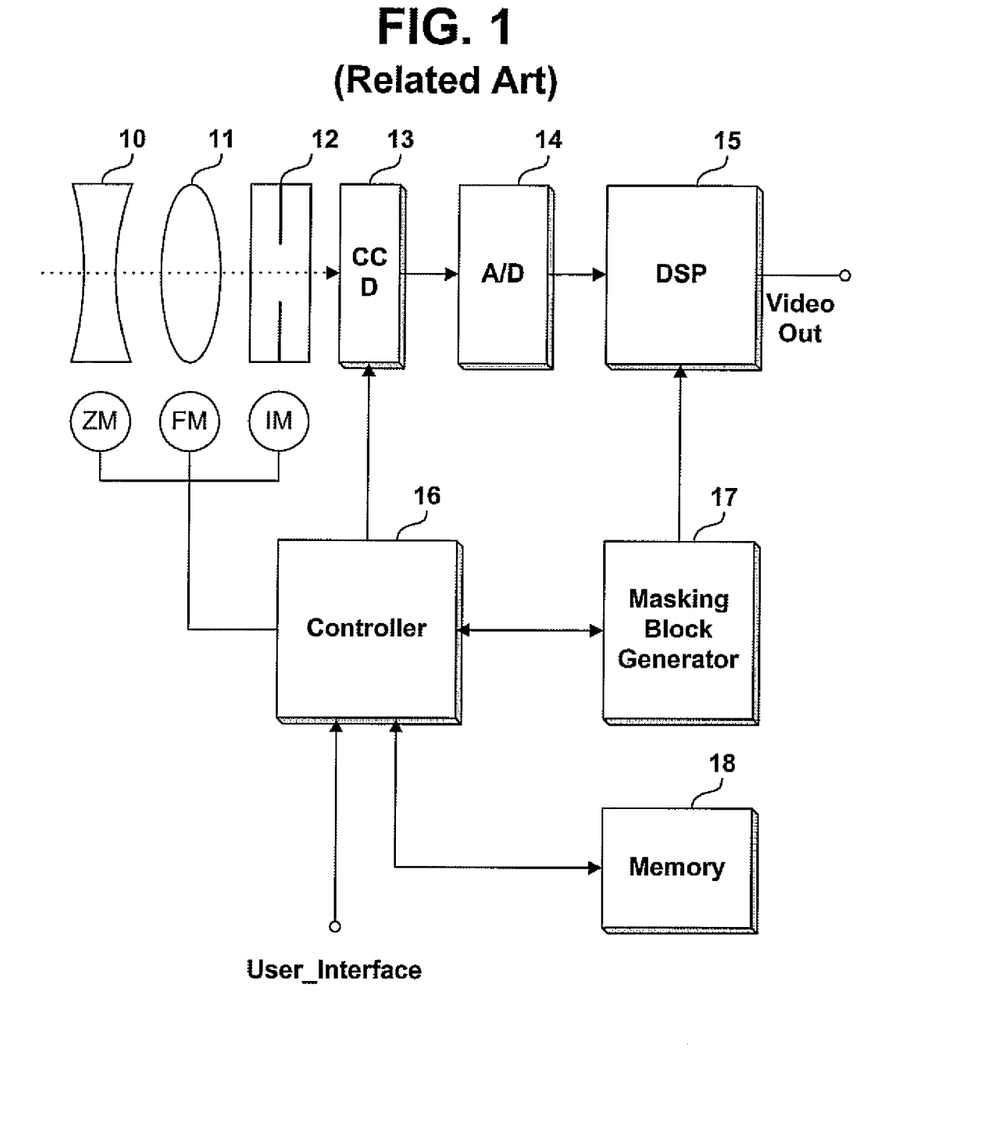
FIG. 1 is a diagram illustrating a configuration of a general monitoring camera.

FIG. 1 is a diagram illustrating a configuration of a general monitoring camera 100 with its zoom magnification adjustable, including a zoom lens 10, a focus lens 11, an iris 12, a charge couple device (CCD) 13, an analog/digital (A/D) converter 14, a digital signal processor 15, a controller 16, and a memory 18.

In addition, the monitoring camera 100 further includes a masking block generator 17 for generating the masking block such as the mosaic image to be overlapped to hide an image of a particular subject included in a monitor image.

Figure 2:
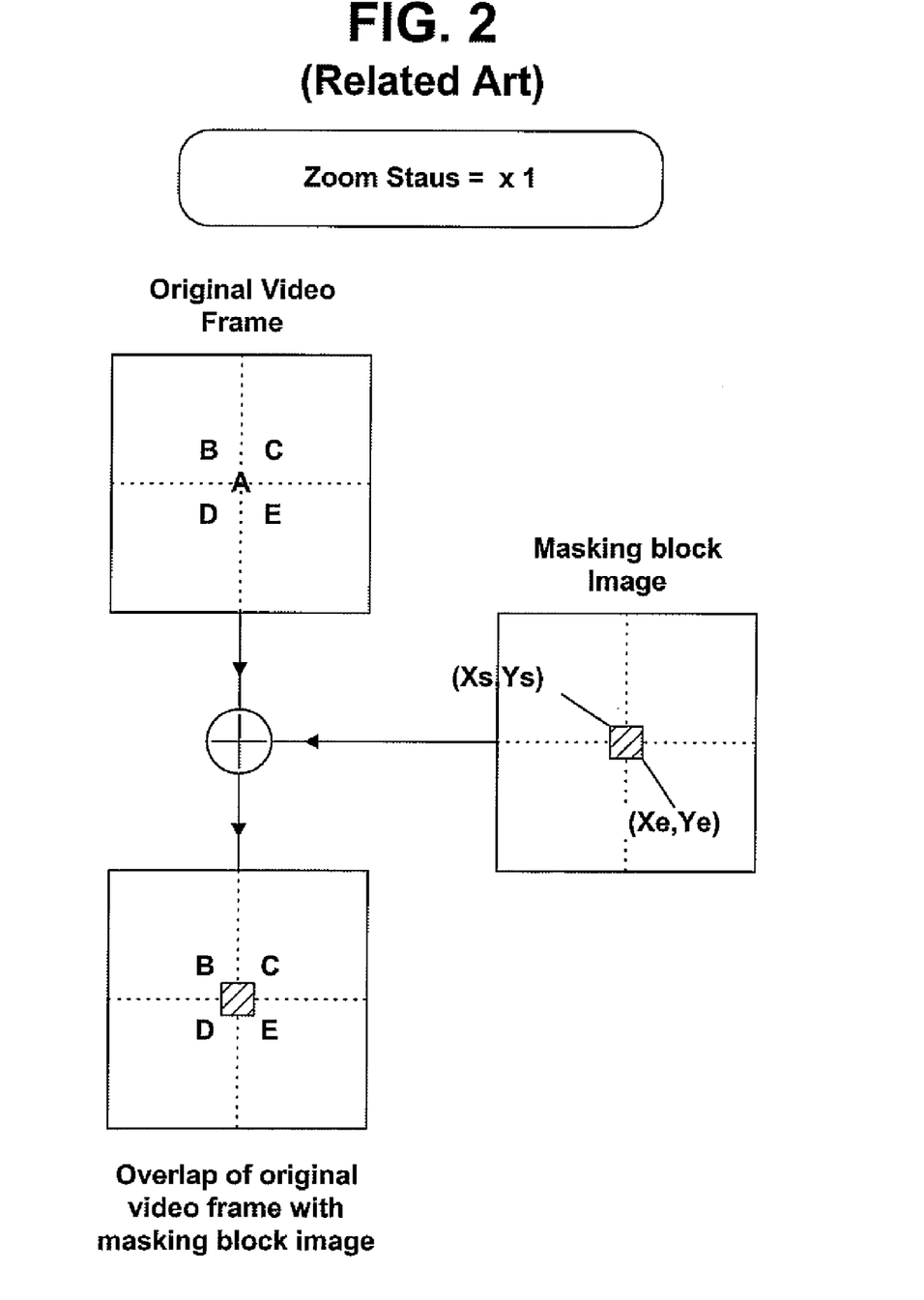
FIG. 2 is a diagram for explaining a procedure for generating a masking block to hide an image of a subject included in a monitor image and overlapping the generated masking block with the monitor image.

As shown in FIG. 2, when privacy protection for a subject A of subjects A, B, C, D and E, which are included in the monitor image to be photographed in a state where zoom magnification is 1 (zoom state=×1) is required, the controller 16 controls operation of the masking block generator 17 and the digital signal processor 15 such that a masking block of a certain size is overlapped with an image of the subject according to a key input by a user.

More specifically, when the user specifies a start position coordinate value (Xs, Ys) and an end position coordinate value (Xe, Ye) of a masking block to be overlapped using a mouse or a directional key, the controller 16 controls the masking block generator 17 to generate the masking block corresponding to the specified coordinate values and controls the digital signal processor 15 to overlap the generated masking block with the monitor image such that the subject A included in the monitor image is not displayed by the masking block.

Figure 3:
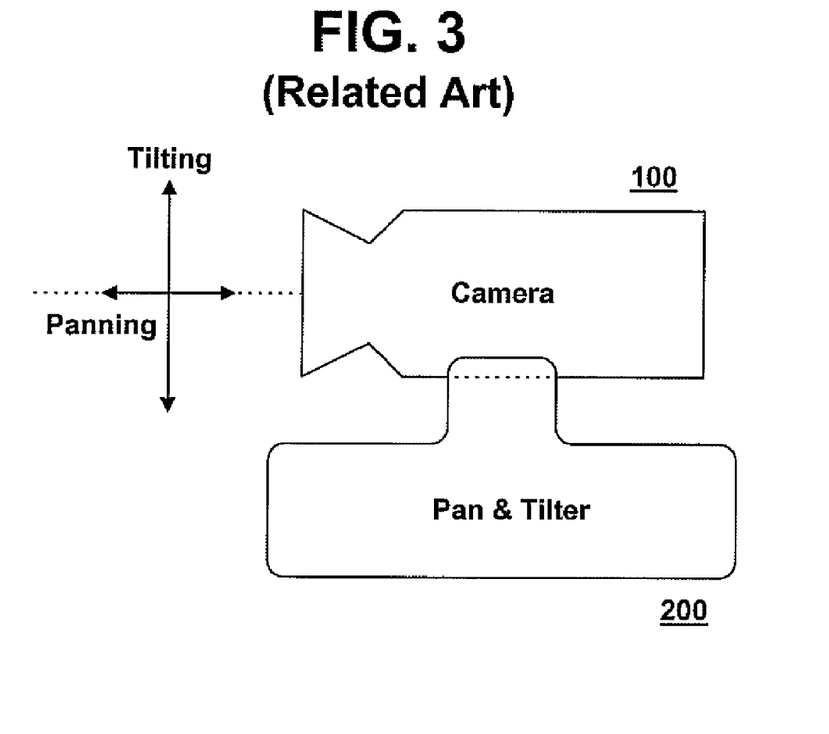
FIG. 3 is a diagram illustrating a monitoring camera, which is mounted on a pan/tilter for rotating the monitoring camera vertically or horizontally.

In addition, for the purpose of photographing a place to be monitored at various angles, the monitoring camera 100 can be mounted on a pan/tilter 200, which is an apparatus for rotating the monitoring camera 100 vertically and horizontally, as shown in FIG. 3. The vertical rotation and the horizontal rotation are referred to as "tilting" and "panning", respectively.

When the monitoring camera zooms in from ×1 to ×4 in zoom magnification, or is tilted vertically or panned horizontally, the size and/or position of an image of the subject appearing in the monitor image are varied between after and before changing the zooming and, tilting and/or panning.

However, under a condition where the masking block for hiding the image of the particular subject included in the monitor image is overlapped with the monitor image, when a zoom lens of the monitoring camera is zoomed and/or the monitoring camera is rotated by the pan/tilter 200 such that the size and/or position of the subject appearing in the monitor image is changed, there is conventionally no method for precisely hiding the particular subject with the changed size and/or position by correspondingly changing the size and/or position of the masking block.

Figure 4:
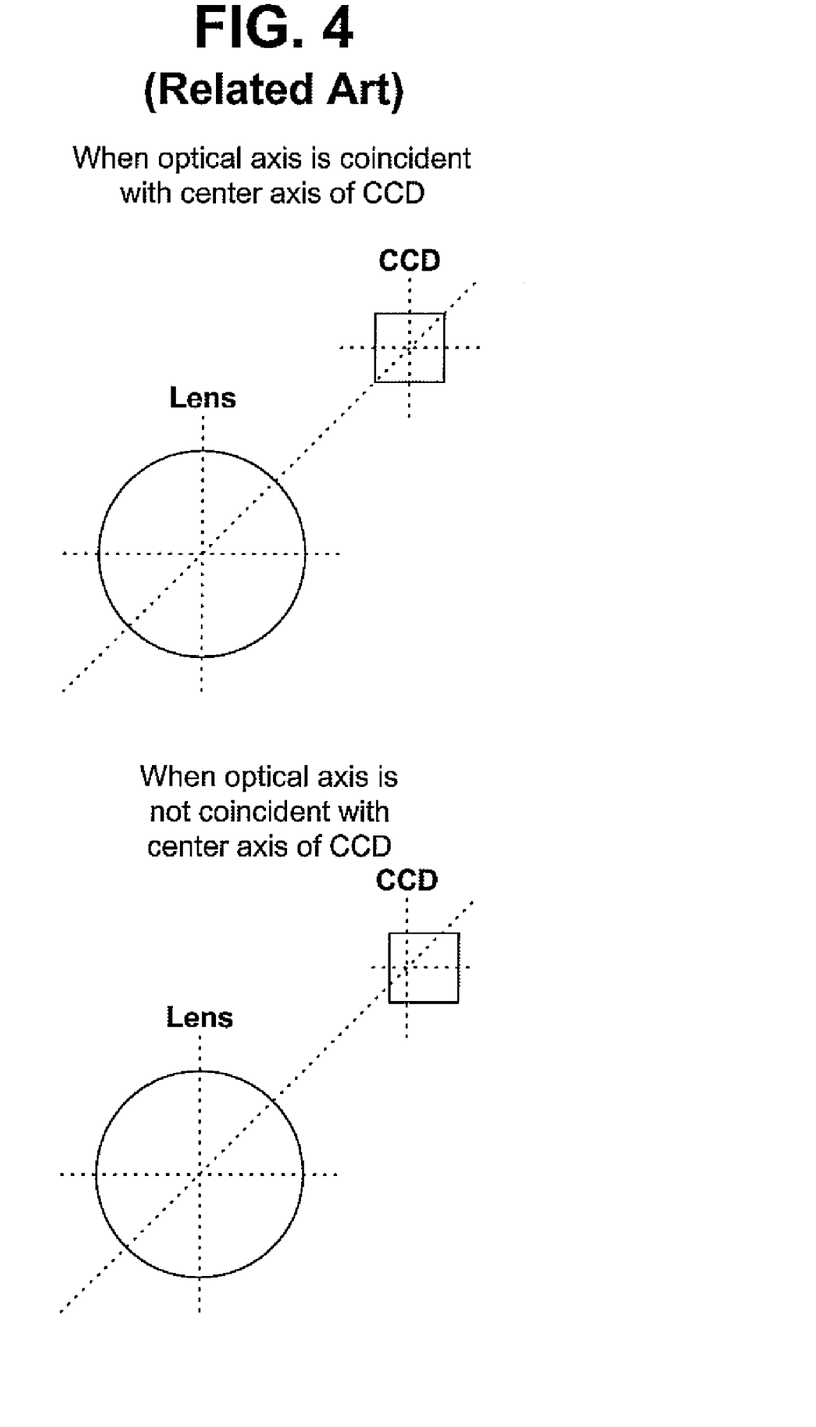
FIG. 4 is a diagram illustrating a case where a center axis of a CCD is not coincident with an optical axis of a zoom lens.
Figure 5:
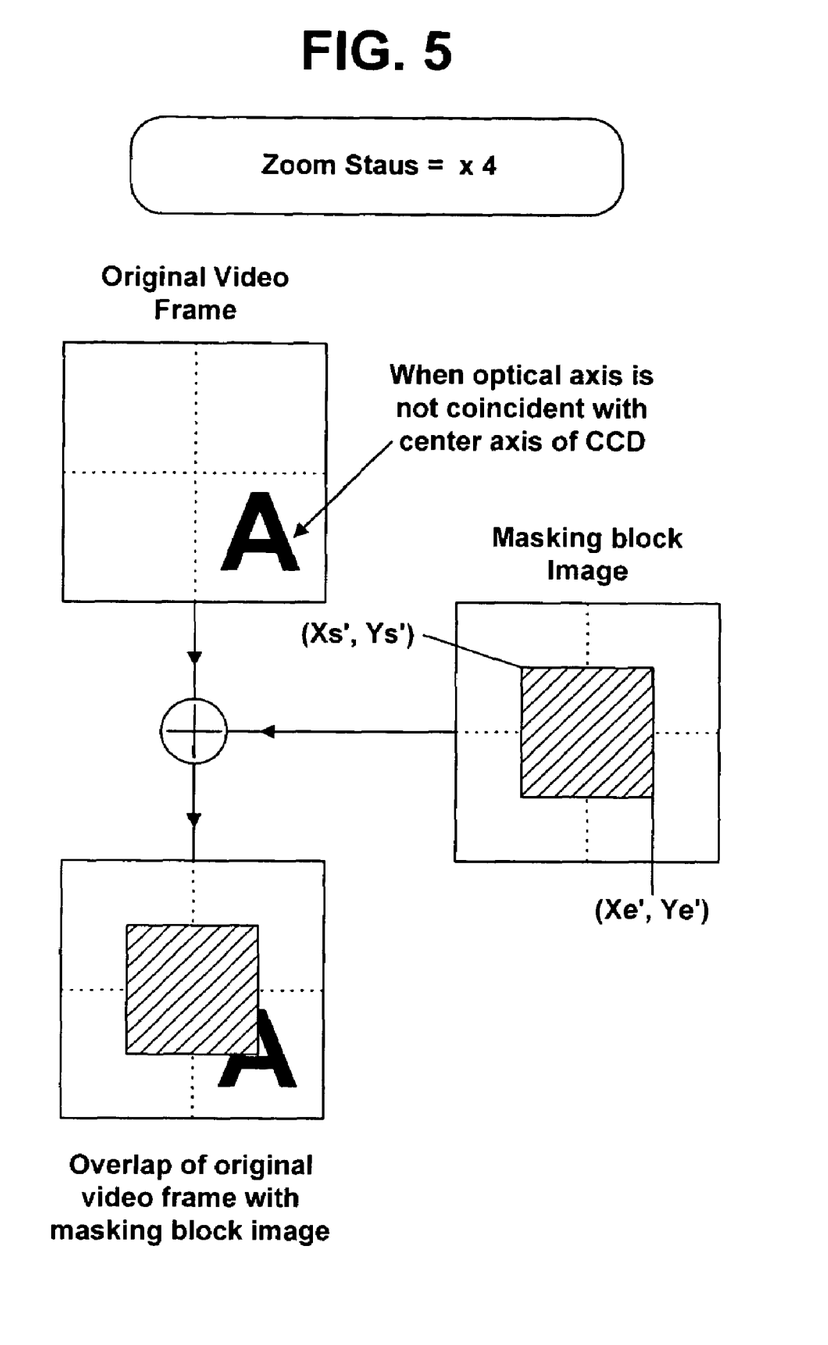
FIG. 5 is a diagram illustrating a case where an image of a subject presented at the center of a monitor image is deviated from the center of the monitor image while being enlarged in size when zoom magnification is increased under a state where a center axis of a CCD is not coincident with an optical axis of a zoom lens.

In addition, if the CCD 13 is not correctly mounted on a printed circuit board (PCB), for example, when a center axis of the CCD 13 is not coincident with an optical axis of the zoom lens due to an error in a manufacture process, as shown in FIG. 4, when the zoom magnification is increased, the image of the subject A positioned at the center of the monitor image in FIG. 2 is deviated from the center of the monitor image which is zoomed in while being enlarged in size. Accordingly, even when the size of the masking block is adjusted to correspond to the increased zoom magnification, the masking block with the adjusted size cannot exactly hide the subject deviated from the center of the monitoring image and appearing with its enlarged size.

Figure 6:
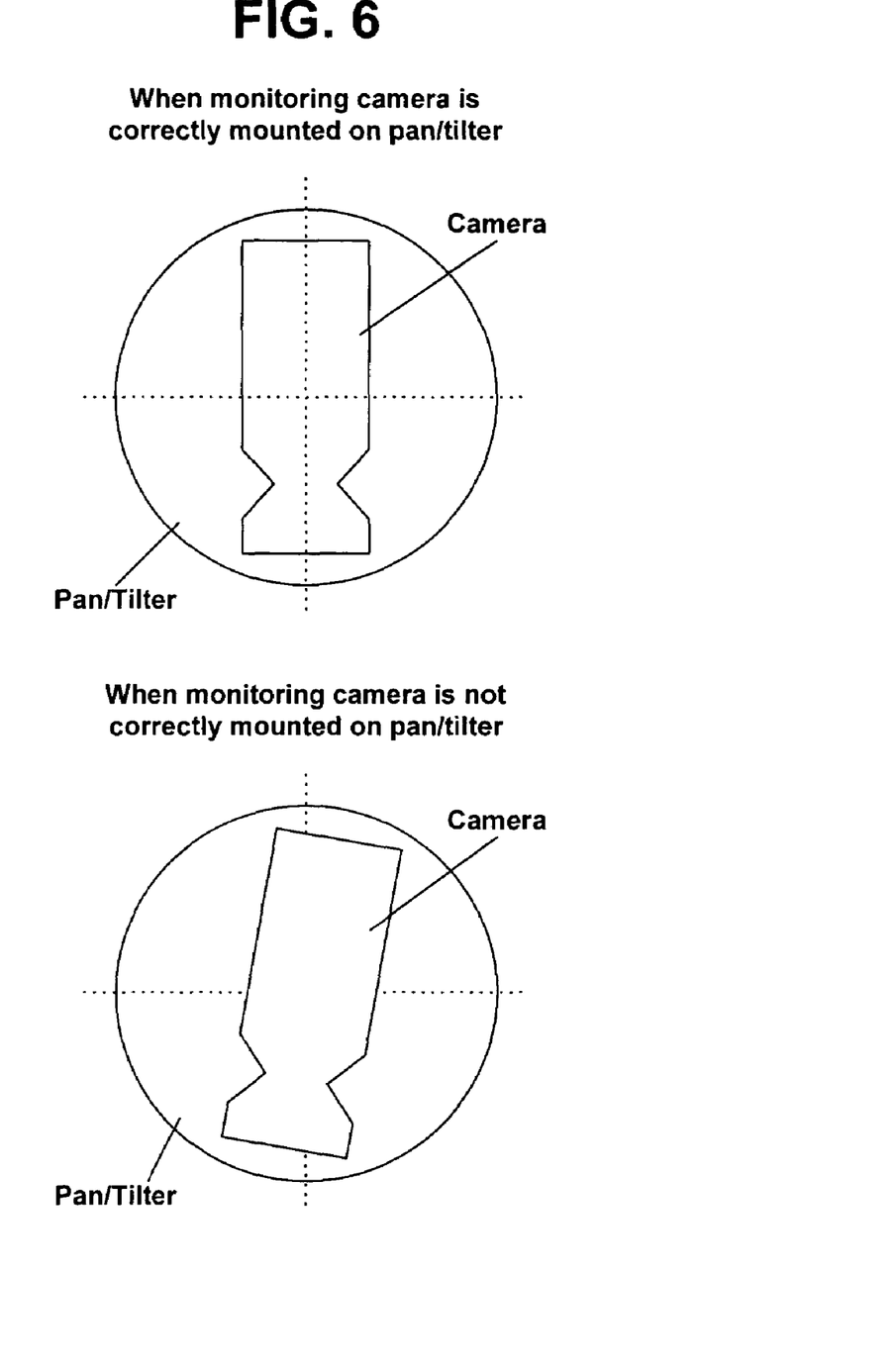
FIG. 6 is a diagram illustrating a comparison between a case where a monitoring camera is correctly mounted on the center of a pan/tilter and a case where the monitoring camera is not correctly mounted on the center of the pan/tilter.

As shown in FIG. 6, if the monitoring camera 100 is not correctly mounted on the center of the pan/tilter 200, a trace along which the image of the subject A included in the monitor image photographed by the monitoring camera 100 actually moves by the panning or tilting becomes an abnormal trace different from a moving trace in a state where the monitoring camera 100 is correctly mounted on the center of the pan/tilter 200. Accordingly, even when the position of the masking block is changed to correspond to a normal panning or tilting, the masking block with the changed position cannot exactly hide the subject moved along the abnormal trace.

In addition, when the monitoring camera is powered off, since information on a set masking block is not stored, a problem arises in that the user has to repeat a setting operation to display the masking block.

On the other hand, a remotely controllable monitoring camera can hide an image of a particular subject requiring protection of privacy as a remote user specifies the masking block using an input device such as a mouse or a directional key prepared in the DVR to control the monitoring camera. However, since there is conventionally no method for specifying the masking block for a remotely uncontrollable monitoring camera, there arises a problem of insufficient protection of privacy.

SUMMARY OF THE INVENTION

Therefore, the present invention has been made in view of the above problems, and it is an object of the present invention to provide a method for adjusting a masking block, which is capable of hiding an image of a subject with its position and size changed according to a zoom in/out magnification and a panning/tilting rotation.

It is another object of the present invention to provide a method for adjusting a masking block, which is capable of following an image of a subject moving along an abnormal trace in a monitor image by a panning or a tilting even if the monitoring camera is not correctly mounted on a pan/tilter.

It is yet another object of the present invention to provide a method for adjusting a masking block, which is capable of hiding an image of a subject appearing at an unexpected position by a zooming operation even if an optical axis of a zoom lens of a monitoring camera is not coincident with a center axis of a CCD.

It is yet another object of the present invention to provide a method for managing information on a masking block such that a set masking block can be precisely restored, when system power is turned off and then turned on again later.

It is yet another object of the present invention to provide a method for setting a masking block for a remotely uncontrollable monitoring camera.

In accordance with an aspect of the present invention, the above and other objects can be accomplished by the provision of a method for controlling a masking block in a monitoring camera, comprising the steps of: (a) confirming a change of a zoom magnification and/or a change of panning or tilting conditions of the monitoring camera under a state where the masking block is set by a user; and (b) adjusting the masking block to correspond to the confirmed change.

Preferably, the masking block is a rectangular masking block or a circular masking block, the rectangular masking block is set by specifying two diagonal vertexes of the masking block or specifying a center of the masking block and displacements in an X axis and a Y axis from the center to a vertex of the masking block, and the circular masking block is set by specifying two points to form a diameter of the circular masking block or specifying a center and a radius of the circular masking block. Preferably, the two specified points, or the center and the displacement are managed as information on the masking block.

Preferably, when the zoom magnification is changed, the position of the masking block is adjusted according to an equation of $$P_2 = \frac{(Z_2 - Z_1)}{Z_1} \times (P_1 - P_C) + P_1,$$

and when the monitoring camera is panned or tilted, the position of the masking block is adjusted according to an equation of $P_2{}^X = \alpha_X{}^T \times (A_2{}^T - A_1{}^T) \times Z_C + \alpha_X{}^P \times (A_2{}^P A_1{}^P) \times Z_C + P_1{}^X$, and $P_2{}^Y = \alpha_Y{}^T \times (A_2{}^T - A_1{}^T) \times Z_C + \alpha_Y{}^P \times (A_2{}^P) \times Z_C + P_1{}^Y$.

Preferably, when a center axis of a CCD of the monitoring camera is not coincident with an optical axis of a lens of the monitoring camera, an interaxis offset is measured and stored according to an equation of $$P_{Off} = \frac{(P_{M2} - P_{M1})}{(Z_2/Z_1 - 1)},$$

and when the zoom magnification is changed, the position of the masking block is adjusted by reflecting the interaxis offset according to an equation of $$\frac{(Z_2 - Z_1)}{Z_1} \times P_{Off}.$$

Preferably, when the monitoring camera is not correctly mounted on the pan/tilter, a pan/tilter offset is measured and stored, and when the monitoring camera is panned or tilted, the masking block is adjusted by reflecting the pan/tilter offset.

In accordance with another aspect of the present invention, the above and other objects can be accomplished by the provision of a method for setting a masking block in a monitoring camera, comprising the steps of: generating a default masking block, overlapping the generated masking block with a monitor image and displaying the monitor image overlapped by the masking block on a screen, when an input device is operated by a user; storing information on a new masking block set by the user using the input device; and overlapping the new masking block having the stored information with the monitor image and displaying the monitor image overlapped by the new masking block.

BRIEF DESCRIPTION OF THE DRAWINGS

The above and other subjects, features and other advantages of the present invention will be more clearly understood from the following detailed description taken in conjunction with the accompanying drawings, in which.

DETAILED DESCRIPTION OF PREFFERRED EMBODIMENTS

Hereinafter, a method for controlling a masking block in a monitoring camera according to preferred embodiments of the present invention will be described in detail with reference to the accompanying drawings.

To begin with, a masking block of the present invention can be a rectangular masking block in parallel with a frame of a monitor image or a circular masking block. A user can specify a left-top position and a right-bottom position, or a left-bottom position and a right-top position on the monitor image to determine the position and size of the rectangular masking block, or can specify two random positions on the monitor image to determine the circular masking block which diameter corresponds to a distance between the two positions, using a mouse and the like.

In the case of the rectangular block, two positions forming a diagonal of the rectangular masking block, that is, the left-top position and the right-bottom position, or the left-bottom position and the right-top position, can be managed as data for the masking block, or a center position of the rectangular masking block and a horizontal displacement and a vertical displacement from the center position of the rectangular masking block to a vertex of the rectangular masking block can also be managed as data for the masking block. In the case of the circular masking block, a center position of the circular masking block and a radius of the circular masking block can be managed as data for the masking block.

The masking control method according to the present invention is applicable to the monitoring camera having the zoom lens as shown in FIG. 1. The A/D converter 14, the digital signal processor 15, the controller 16, and the memory 18, as shown in FIG. 1, maybe included in the monitoring camera 100, or alternatively, in a remote DVR.

Figure 7:
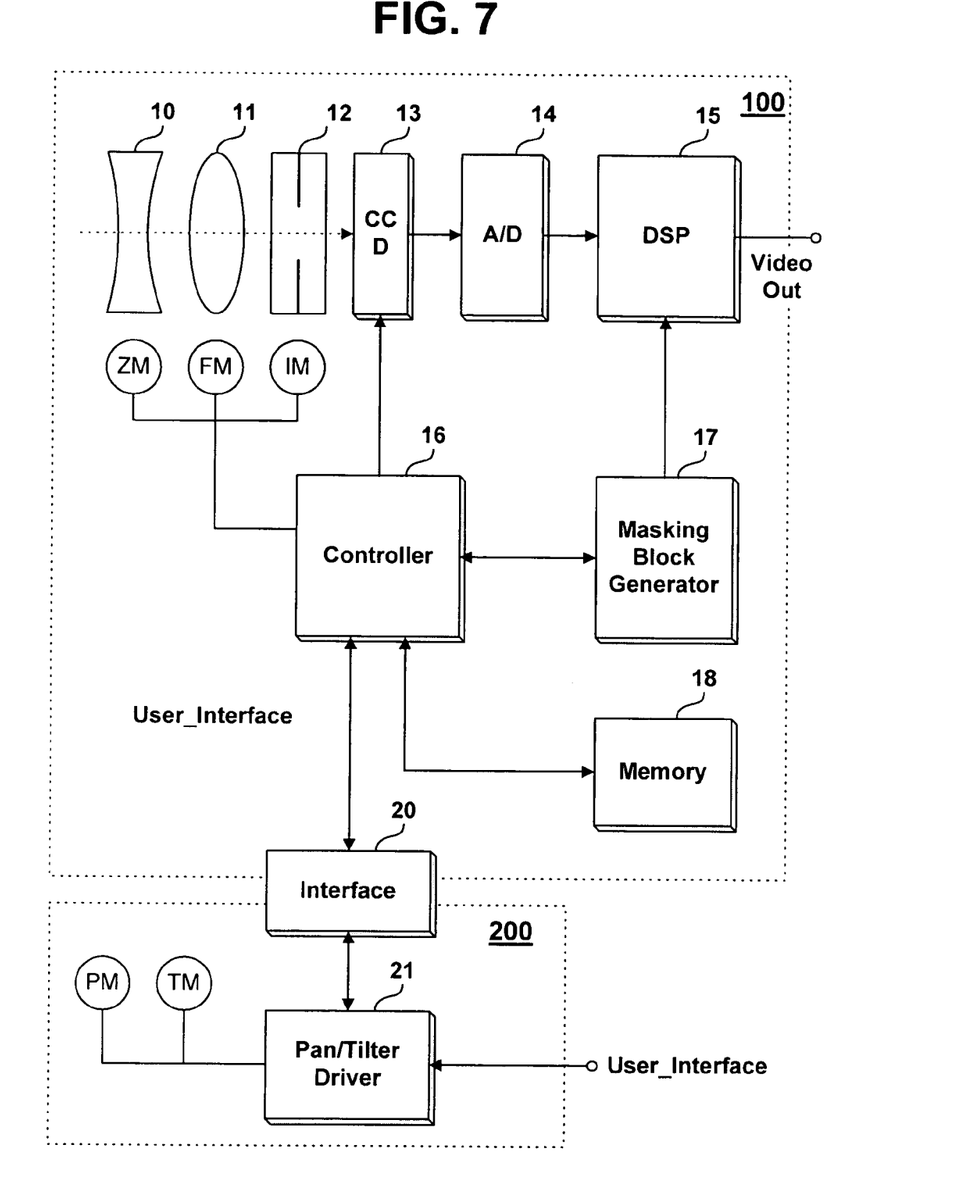
FIG. 7 is a diagram illustrating a combined structure of a monitoring camera to which a masking block control method of the present invention is applied and a pan/tilter.

In addition, the masking block control method for the panning and tilting is applicable to a combined structure of the monitoring camera 100 and the pan/tilter 200 as shown in FIG. 7. Referring to FIG. 7, the pan/tilter 200 includes a tilt motor TM for rotating the monitoring camera 100 vertically, a pan motor PM for rotating the monitoring camera 100 horizontally, a pan/tilter driver 21 for driving the tilt motor TM and/or the pan motor PM to rotate the monitoring camera vertically and horizontally according to an operation by the user or instructions from the controller 16 of the monitoring camera, and sending rotation conditions of the monitoring camera 100 to the controller 16, and an interface 20 interfacing between the controller 16 and the pan/tilter driver 21.

The controller 16 of the monitoring camera confirms variation of panning and tilting conditions from the rotation conditions of the monitoring camera transmitted from the pan/tilter driver 21 and detects the position of the zoom lens to confirm variation of zoom magnification.

Upon confirming the variation of the panning/tilting conditions and/or the variation of the zoom magnification under a state where the masking block for hiding the image of the particular subject in the monitor image is set, the controller 16 of the monitoring camera controls the masking block generator 17 to adjust the size and position of the set masking block such that the set masking block can precisely hide the image of the particular subject which is moved and/or magnified/reduced in the monitor image according to the variations of the confirmed panning/tilting conditions and/or zoom magnification.

In addition, upon confirming the variations of the panning/tilting conditions and/or zoom magnification, the controller 16 of the monitoring camera stores and manages data on the panning/tilting conditions, the zoom magnification and the masking block in the memory 18, for example, a nonvolatile memory such as an EEPROM. Accordingly, when the system is powered off, and powered on later, it can easily restore the masking block before it is powered off.

On the other hands, assuming that the zoom lens 10 and the focus lens 11 composing the monitoring camera 100 is formed by one lens, a focal length in the case where the zoom magnification of the lens is '1' is 'f', a distance from the lens to the subject is 'a', and a distance from a real image formed at a side opposite to the subject through the lens to the lens is 'b', since 'a', 'b' and 'f' have a relationship of $1/a + 1/b = 1/f$, $b = (a \cdot f)/(a-f)$. Since the CCD 13 is placed between the lens and the real image of the subject, the size of an image of the subject formed on the CCD 13 is in proportion to the distance 'b'. Also, since the focal length 'f' is typically even smaller than the distance 'a' (a>>f), $b \approx (a \cdot f)/a = f$, showing that 'b' is in proportion to the focal length 'f'. Accordingly, the size of the image formed on the CCD 13 is in proportion to the focal length 'f' of the lens.

When the zoom magnification of the lens becomes 'n' times and accordingly the focal length 'f' becomes 'nf', since 'nf' is even smaller than 'a' (a>>nf), $b_n = (n \cdot a \cdot f)/(a - n \cdot f) \approx (n \cdot a \cdot f)/a = n \cdot f$, showing that '$b_n$' is nearly 'n' times as large as 'b' in the case of the zoom magnification of '1'. Accordingly, it can be generally assumed that the size of the image formed on the CCD 13 is 'n' times increased when the zoom magnification becomes 'n'.

Figure 8:
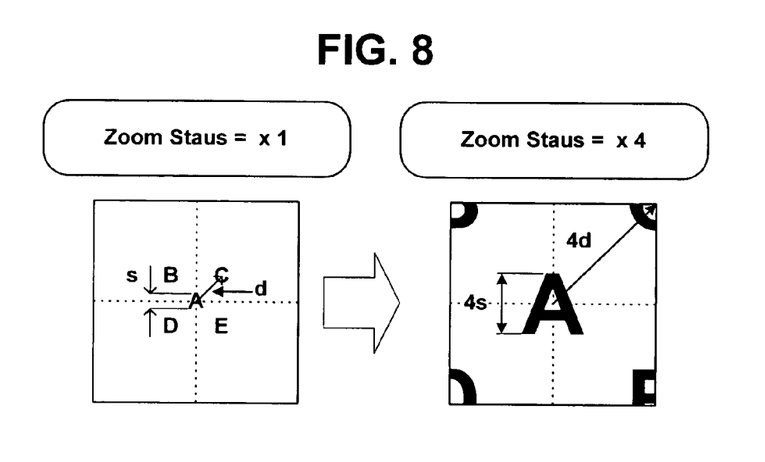
FIG. 8 is a diagram illustrating that position and size of an image of the subject in a monitor image are changed according to a change in zoom magnification.

Also, when the zoom magnification becomes 'n', the position of the image of the subject in the monitor image is moved as well as the size of the image of the subject in the monitor image is 'n' times increased. FIG. 8 shows a monitor image obtained by zooming in and photographing the subject, which is photographed with the zoom magnification of 1 in FIG. 2, with zoom magnification of 4.

Referring to FIG. 8, the size of the image of the subject included in the monitor image increases 4 times in proportion to the zoom magnification. Moreover, the position of the image of the subject becomes distant from the center of the monitor image. At this time, each pixel composing the image of the subject included in the monitor image of FIG. 8 with the zoom magnification of 4 is displayed at a position distant by 4 times from the center of the monitor image, compared to each pixel composing the image of the subject included in the monitor image of FIG. 2 with the zoom magnification of 1. Generally, when the zoom magnification becomes n, the image of the subject in the monitor image becomes distant by n times from the center of the monitor image, compared to the image of the subject before the zoom magnification is changed.

For example, when the zoom magnification is changed from $Z_1$ to $Z_2$, a point $P_1$ within the monitor image with the zoom magnification of $Z_1$ moves to a point $P_2$ within the monitor image with the zoom magnification of $Z_2$. The point $P_2$ satisfies a relationship that $$P_2 = \frac{Z_2}{Z_1} \times (P_1 - P_C) + P_C,$$

where $P_C$ denotes the center of the monitor image. Expressing $P_2$ by a difference value between $P_2$ and $P_1$, $$P_2 = \frac{(Z_2 - Z_1)}{Z_1} \times (P_1 - P_C) + P_1.$$

Expressing $P_2$ for an X axis and a Y axis, $$P_2^X = \frac{(Z_2 - Z_1)}{Z_1} \times (P_1^X - P_C^X) + P_1^X, \text{ and}$$

$$P_2^Y = \frac{(Z_2 - Z_1)}{Z_1} \times (P_1^Y - P_C^Y) + P_1^Y.$$

Also, the size of the image of the subject composed of points within the monitor image with the zoom magnification of $Z_1$ has a zoom ratio of $Z_2/Z_1$.

Accordingly, the masking block set to hide the image of the subject in the monitor image with the zoom magnification of $Z_1$ should be changed according to the above equations when the zoom magnification is changed to $Z_2$. In the case of the rectangular masking block, by transforming two positions forming a diagonal of the rectangular masking block, that is, the left-top position and the right-bottom position, or the left-bottom position and the right-top position, according to the above equations, or transforming a center point of the rectangular masking block according to the same equations and multiplying a horizontal displacement and a vertical displacement from the center point of the rectangular masking block to a vertex of the rectangular masking block by a ratio of the zoom magnification, a new masking block corresponding to the changed zoom magnification is set. Similarly, in the case of the circular masking block, by transforming a center point of the circular masking block according to the same equations and multiplying a radius of the circular masking block by the ratio of the zoom magnification, a new masking block corresponding to the changed zoom magnification is set.

Meanwhile, when the monitoring camera is vertically or horizontally rotated by the pan/tilter, the image of the subject in the monitor image moves. It can be assumed that a movement displacement of the image of the subject by the rotation of the monitoring camera is in proportion to a rotation angle and a current zoom magnification. Accordingly, the point $P_2$ in the monitor image after the monitoring camera is rotated, at which the point P1 in the monitor image before the monitoring camera is rotated is placed, can be expressed by the following equation. Expressing the $P_2$ for the X axis, $P_2^X \cong \alpha_X^{T} \times (A_2^T - A_1^T) \times Z_C + \alpha_X^P \times (A_2^P - A_1^P) \times Z_C + P_1^X$, where $\alpha_X^T$ is a movement displacement in an X axis direction when the zoom magnification is 1 and the monitoring camera is tilted by a degree of 1, $\alpha_X^P$ is a movement displacement in the X axis direction when the zoom magnification is 1 and the monitoring camera is panned by a degree of 1, $A_1^T$ and $A_2^T$ are tilting angles before and after rotation, $A_1^P$ and $A_2^P$ are panning angles before and after rotation, and $Z_C$ is a current zoom magnification. This is true of the Y axis.

When the zoom magnification is changed while the monitoring camera is rotated, a point $(P_2=(P_2^X, P_2^Y))$ in the monitor image after change of the zoom magnification and the rotation of the monitoring camera, at which the point $P_1$ in the monitoring camera before the change of the zoom magnification and the rotation of the monitoring camera is placed, can be expressed by the following equation.

$$P_2^X \cong \frac{(Z_2 - Z_1)}{Z_1} \times (P_1^X - P_C^X) + \alpha_X^T \times (A_2^T - A_1^T) \times Z_2 + \alpha_X^P \times (A_2^P - A_1^P) \times Z_2 + P_1^X$$

-continued $$P_2^Y \cong \frac{(Z_2 - Z_1)}{Z_1} \times (P_1^Y - P_C^Y) + \alpha_Y^T \times (A_2^T - A_1^T) \times Z_2 + \alpha_Y^P \times (A_2^P - A_1^P) \times Z_2 + P_1^Y$$

where $\alpha_X^T$ and $\alpha_X^P$ are values calculated from a result of a test performed in advance and are stored in the memory 18 of the monitoring camera 100 in advance.

Accordingly, when the zoom magnification and/or the tilting/panning conditions are changed under the state where the masking block is set, by changing the set masking block according to the above equation, the image of the subject in the monitor image which is moved and/or enlarged/reduced can be precisely hidden.

In the meantime, when the zoom magnification of the monitoring camera is changed under the state where the masking block is set, the controller 16 of the monitoring camera controls the masking block generator 17 to adjust the size and position of the masking block to correspond to the changed zoom magnification. At this time, if the adjusted masking block is deviated from the image of the subject with the position and size changed according to the change of the zoom magnification, and accordingly, cannot precisely hide the image of the subject, the controller 16 determines that the center axis of the CCD 13 is not coincident with the optical axis of the lens. Namely, it is determined that the CCD 13 is not correctly mounted on the printed circuit board or the lens is not precisely aligned in the course of assembly of the monitoring camera 100.

Figure 9:
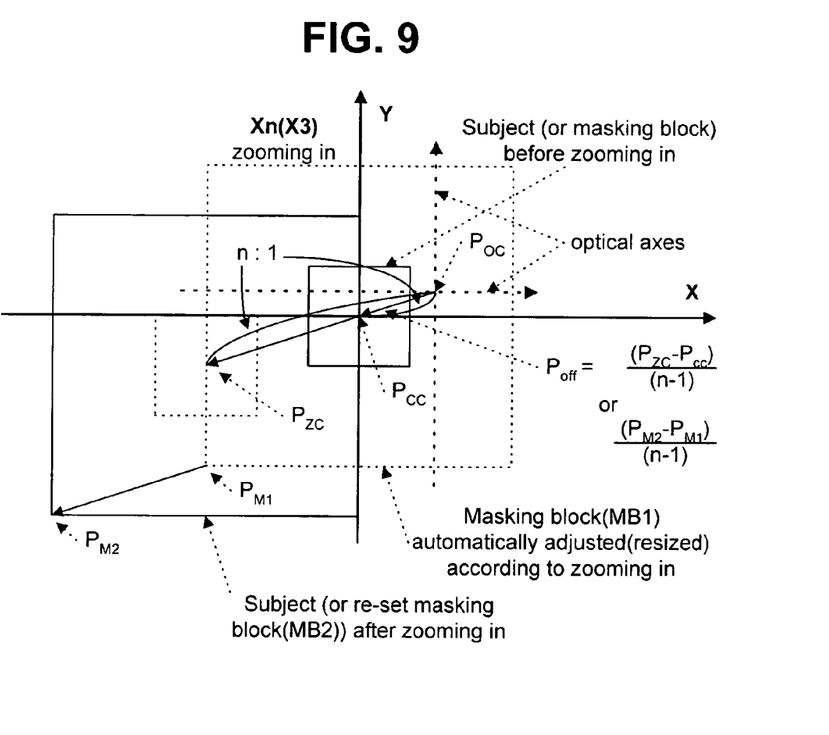
FIG. 9 is a diagram for explaining a method for calculating a distance between a center axis of a CCD and an optical axis of a zoom lens.

FIG. 9 is a diagram for explaining a method for calculating a distance between the center axis of the CCD and the optical axis of the lens. Referring to FIG. 9, first, it is assumed that the center $P_{CC}$ of the CCD is spaced apart by $P_{off}$ from the optical axis $P_{OC}$ of the lens ($P_{CC}=P_{OC}+P_{off}$). When the image of the subject is placed on the center of the monitor image and the monitoring camera zooms in to change the zoom magnification from $Z_1$ to $Z_2$ under the state where the masking block to hide the image of the subject is set, the image of the subject is zoomed in with the optical axis of the lens as a center. Accordingly, the center of the image of the subject, which is zoomed in and hence enlarged, moves to a point $P_{ZC}$ rather than the center $P_{CC}$ of the CCD. However, although a masking block MB1 which is adjusted according to the change of the zoom magnification is changed in size, its center is not changed. Subsequently, the user sets a new masking block to hide the image of the subject with its center moved to the point $P_{ZC}$.

Herein, since a relationship that $Z_2/Z_1:1=n:1=(P_{Off}+P_{ZC}-P_{CC}):P_{off}$ is established, the distance $P_{off}$ between the center of the CCD and the optical axis of the lens can be obtained by an equation of $$P_{Off} = \frac{(P_{ZC} - P_{CC})}{(Z_2/Z_1 - 1)}.$$

In the equation for obtaining the distance $P_{off}$, since it is not easy to directly obtain the center $P_{ZC}$ of the image of the subject, $(P_{ZC}-P_{CC})$ is obtained by other methods. $(P_{ZC}-P_{CC})$ is coincident with a difference $(P_{M2}-P_{M1})$ between a vertex PM1 of the masking block BM1 with its size adjusted and a vertex PM2 of the new masking block BM2 corresponding to the vertex PM1. Accordingly, the distance $P_{off}$ can be also obtained by an equation of $$P_{Off} = \frac{(P_{M2} - P_{M1})}{(Z_2/Z_1 - 1)}.$$

On the other hand, the point $P_1$ composing the image of the subject is zoomed in from $Z_1$ to $Z_2$ with the optical axis $P_{OC}$ as a center to move to the point $P_2$ satisfying the following equation.

$$P_2 = \frac{Z_2}{Z_1} \times (P_1 - P_{OC}) + P_{OC} = \frac{Z_2}{Z_1} \times (P_1 - P_{CC}) +$$

$$P_{CC} + \frac{(Z_2 - Z_1)}{Z_1} \times P_{Off}, \text{ or}$$

$$P_2 = \frac{(Z_2 - Z_1)}{Z_1} \times (P_1 - P_{CC}) + P_1 + \frac{(Z_2 - Z_1)}{Z_1} \times P_{Off}$$

Accordingly, when the masking block MB1 with its size adjusted moves by $$\frac{(Z_2 - Z_1)}{Z_1} \times P_{Off},$$

the image of the subject with its center moved to the point $P_{ZC}$ can be precisely hidden.

Figure 10:
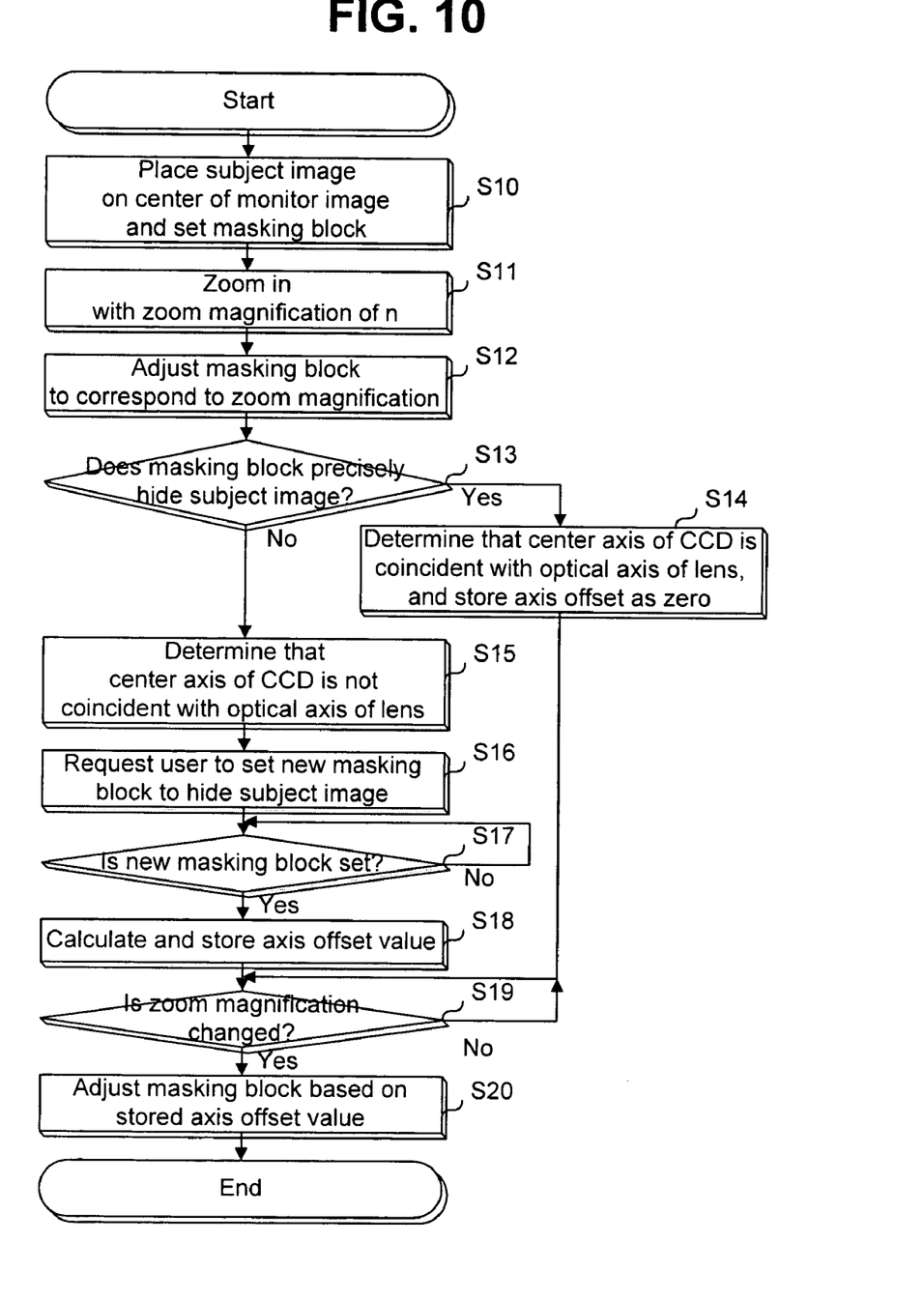
FIG. 10 is a flow chart illustrating one embodiment of the present invention in accordance with which a distance between a center axis of a CCD and an optical axis of a zoom lens is measured and corrected when it is determined that the center axis of the CCD is not coincident with the optical axis of the zoom lens.

FIG. 10 is a flow chart illustrating one embodiment of the present invention in accordance with which the distance between the center axis of the CCD and the optical axis of the lens, that is, an interaxis offset value, is measured and corrected when it is determined that the center axis of the CCD is not coincident with the optical axis of the lens.

First, the controller 16 of the monitoring camera causes a user to set a masking block to hide an image of a subject under a state where zoom magnification is 1 and the image of the subject is placed on the center of a monitor image (S10). After the masking block is set, the controller 16 controls the monitoring camera to zoom in to have the zoom magnification of n (S11) and controls the masking block generator 17 to adjust the size of the masking block to correspond to the zoom magnification of n (S12).

Subsequently, the controller 16 requests the user to confirm whether the adjusted masking block precisely hides the image of the subject changed according to the change of the zoom magnification (S13). If the adjusted masking block precisely hides the changed image of the subject, that is, the image of the subject is changed in size, not in position with the change of the zoom magnification, it is determined that the center axis of the CCD is coincident with the optical axis of the lens, and accordingly, the interaxis offset value is specified as zero (S14).

On the contrary, if the adjusted masking block does not precisely hide the changed image of the subject, that is, the image of the subject, which was placed on the center of the monitor image, is not only changed in size, but also moves to a point other than the center of the monitor image, it is determined that the center axis of the CCD is not coincident with the optical axis of the lens (S15), and the user is requested to set a new masking block to precisely hide the image of the subject with its position changed (S16). At this time, the user is provided with information on the size of the masking block adjusted in the step (S12) and is requested to set the size of the new masking block to be equal to the size of the adjusted masking block.

When the new masking block to precisely hide the changed image of the subject is set by the user (S17), the controller 16 compares information on the masking block adjusted in step S12 with information on the new masking block set in step S17, for example, compares positions of the centers or vertexes of the two masking blocks each other, calculates an interaxis offset value from a difference value between the positions, and stores the calculated interaxis offset value in the memory 18 (S18).

Subsequently, upon confirming the change of the zoom magnification of the monitoring camera 100 (S19), the controller 16 compensates for a difference in position between the image of the subject and the masking block due to a discrepancy between the center axis of the CCD and the optical axis of the lens, using the interaxis offset value read from the memory 18 when the masking block is adjusted (S20).

On the other hand, upon confirming that the monitoring camera is tilted or panned under the state where the masking block is set, the controller 16 of the monitoring camera controls the masking block generator 17 to adjust the position of the masking block to correspond to the change of the tilting or panning conditions. If the masking block with its position adjusted cannot precisely hide the image of the subject with its position changed according to the change of the tilting or panning conditions, the controller 16 determines that the monitoring camera 100 is not correctly mounted on the center of the pan/filter 200.

Figure 11:
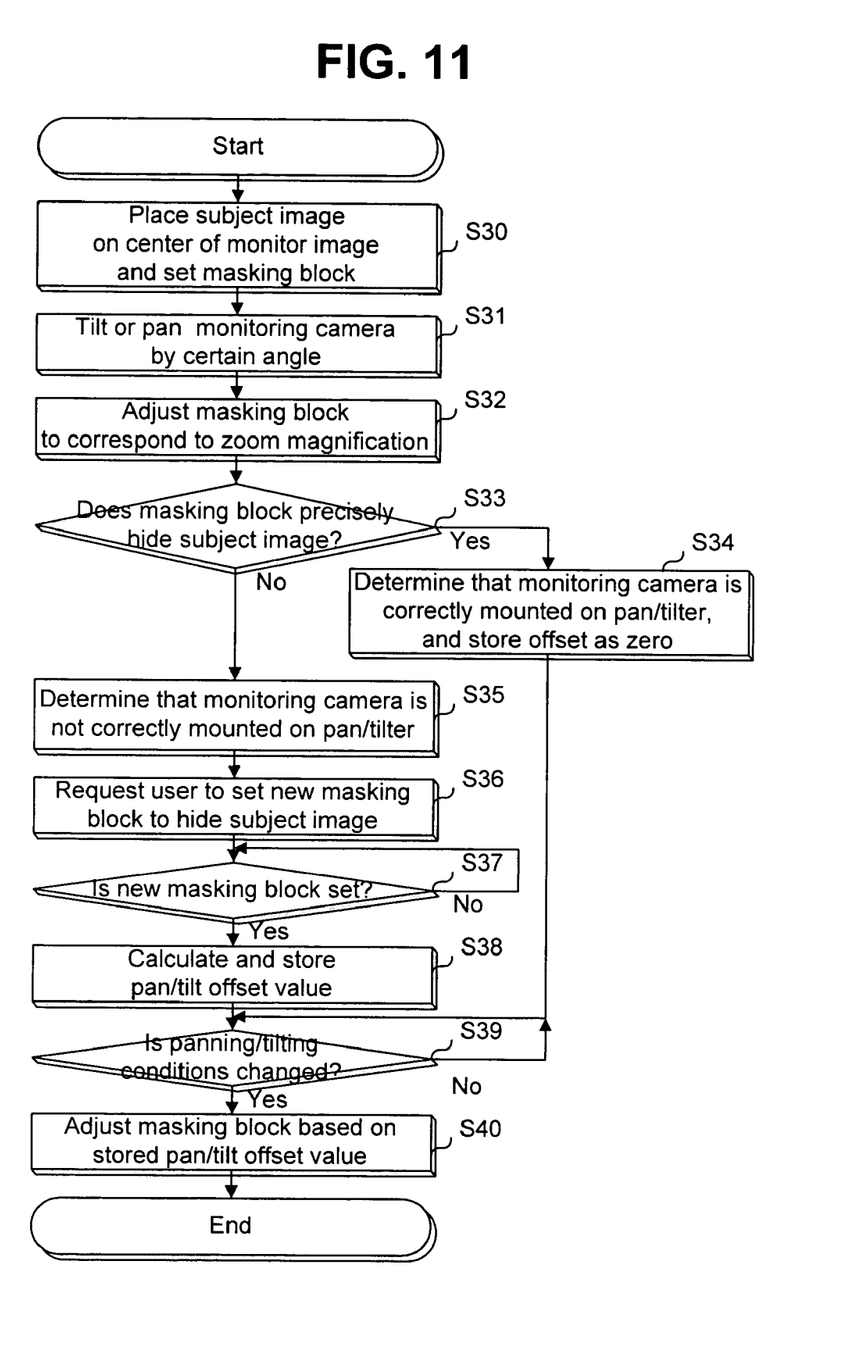
FIG. 11 is a flow chart illustrating another embodiment of the present invention in accordance with which an offset between an image of a subject and a masking block, which occurs by an incorrect coupling between a monitoring camera and a pan/tilter, is measured and corrected.

FIG. 11 is a flow chart illustrating another embodiment of the present invention in accordance with which an offset between the image of the subject and the masking block, which occurs by an incorrect coupling between the monitoring camera and the pan/tilter, is measured and corrected.

First, the controller 16 of the monitoring camera causes the user to set the masking block to hide the image of the subject in the monitor block (S30). When the masking bloc is set, the controller 16 instructs the pan/tilter driver 21 to drive the pan motor PM or the tilt motor TM such that the monitoring camera 100 is rotated by a certain degree of angle, for example, a degree of 1, in the panning direction or the tilting direction (S31), and simultaneously, the position of the masking block is adjusted according to the rotation of the monitoring camera (S32).

Subsequently, the controller 16 requests the user to confirm whether the adjusted masking block precisely hides the image of the subject with its position changed according to the rotation of the monitoring camera (S33). If the adjusted masking block precisely hides the image of the subject with its position changed, it is determined that the monitoring camera 100 is correctly mounted on the center of the pan/tilter 200, and a pan/tilter offset is specified as zero (S34).

On the contrary, if the adjusted masking block does not precisely hide the image of the subject with its position changed, it is determined that the monitoring camera 100 is not correctly mounted on the center of the pan/tilter 200 (S35), and the user is requested to set a new masking block to precisely hide the image of the subject with its position changed (S36). At this time, since there is no variation of the zoom magnification of the monitoring camera, the user is provided with information on the size of an existing masking block and is requested to set the size of the new masking block to be equal to the size of the existing masking block.

When the new masking block to precisely hide the image of the subject with its position changed is set by the user (S37), the controller 16 compares information on the masking block adjusted in step S32 with information on the new masking block set in step S37, for example, compares positions of the centers of the two masking blocks each other, calculates a difference value between the positions, and stores the calculated difference value as a pan or tilt offset value in the memory 18 (S38).

Subsequently, upon confirming the change of the panning or tilting conditions of the monitoring camera 100 (S39), the controller 16 compensates for a difference in position between the image of the subject and the masking block due to an incorrect coupling between the monitoring camera and the pan/tilter, using the pan or tilt offset value read from the memory 18 when the masking block is adjusted (S40).

Meanwhile, if the monitoring camera 100 as shown in FIGS. 1 and 7 cannot be controlled in a remote site, the masking block can be set by using a plurality of key buttons basically provided in the monitoring camera. The plurality of key button may include directional buttons in addition to buttons specified for setting the masking block.

Figure 12:
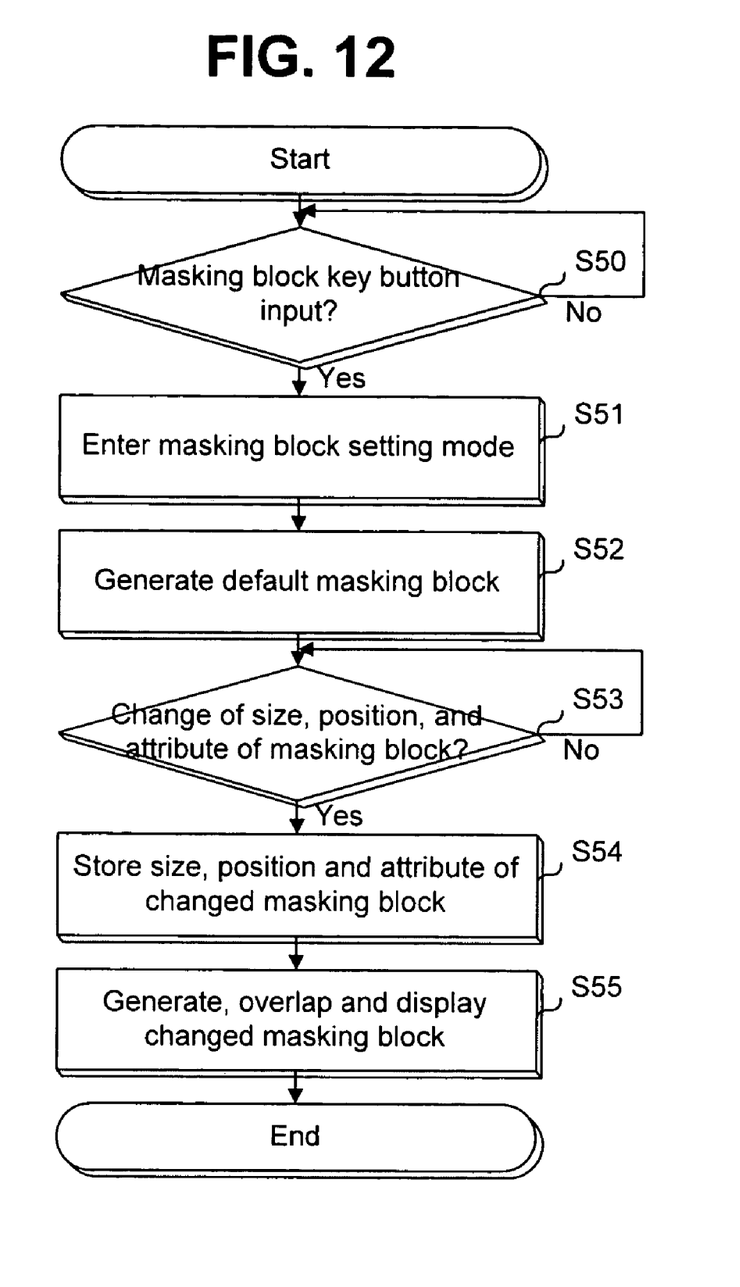
FIG. 12 is a flow chart illustrating yet another embodiment of the present invention in accordance with which a masking block is set by using key buttons prepared in a remotely uncontrollable monitoring camera.

FIG. 12 is a flow chart illustrating an embodiment where the masking block is set using key buttons prepared in a remotely uncontrollable monitoring camera.

First, when a key button specified for setting the masking block (S50) is pressed, the controller 16 enters a 'masking block setting mode' (S51), controls the masking block generator 17 to generate the masking block with an attribute, such as color, pattern, shape or size, which is set by a default, in the center of the monitor image, and controls the digital signal processor 15 to overlap the generated masking block with the monitor image to be photographed and display the monitor image overlapped by the masking block on a screen (S52).

The user confirms the default attribute of the masking block, and specifies the position and/or size of the masking block to hide the image of the subject included in the monitor image and changes the attribute such as color, pattern and/or shape of the masking block, using the key button and the directional buttons specified for setting the masking block (S53).

The controller 16 stores the attribute of the masking block specified by the user in the memory (S54), controls the masking block generator 17 to generate a masking block with the attribute newly specified by the user, and controls the digital signal processor 15 to overlap the generated masking block with the monitor image and display the monitor image on the screen (S55).

As apparent from the above description, the present invention provides a method for adjusting a masking block, which is capable of precisely hiding an image of a subject with its position and size changed according to a change of zoom magnification and a panning/tilting rotation.

In addition, the present invention provides a method for adjusting a masking block, which is capable of precisely hiding an image of a subject moving along an abnormal trace in a monitor image by a panning or a tilting even if the monitoring camera is not correctly mounted on a pan/tilter.

In addition, the present invention provides a method for adjusting a masking block, which is capable of precisely hiding an image of a subject appearing at an unexpected position by a zooming operation even if an optical axis of a lens of a monitoring camera is not coincident with a center axis of a CCD.

In addition, the present invention provides a method for managing information on a masking block, which is capable of precisely restoring a set masking block, when system power is turned off and turned on later.

Furthermore, the present invention provides a method for setting a masking block for a remotely uncontrollable monitoring camera.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a masking block in a monitoring camera, the method comprising:
   (a) receiving a change of at least one of a zoom magnification information or a change of panning or tilting information of the monitoring camera;
   (b) adjusting the masking block to correspond to the confirmed received information; and
   (c) further adjusting the masking block adjusted to correspond to the change of the zoom magnification by reflecting an interaxis offset occurring when a center axis of a CCD of the monitoring camera is not coincident with an optical axis of a lens of the monitoring camera.

2. The method as set forth in claim 1, wherein a masking block is a rectangular masking block or a circular masking block.

3. The method as set forth in claim 2, wherein a position and size of the rectangular masking block is determined by specifying two vertexes to form a diagonal of the rectangular masking block by the user or specifying a center of the rectangular masking block and vertical and horizontal displacements from the center to a vertex of the rectangular masking block by the user.

4. The method as set forth in claim 3, wherein, when the masking block is the rectangular masking block, information on the position and size of the rectangular masking block is managed as data on the two vertexes to form the diagonal of the rectangular masking block or data on the center of the rectangular masking block and the vertical and horizontal displacements from the center to the vertex of the rectangular masking block.

5. The method as set forth in claim 2, wherein a position and size of the circular masking block is determined by specifying two points to form a diameter of the circular masking block by the user or specifying a center and a radius of the circular masking block by the user.

6. The method as set forth in claim 5, wherein when the masking block is the circular masking block, information on the position and size of the circular masking block is managed as data on the two points to form the diameter of the circular masking block or data on the center and the radius of the circular masking block.

7. The method as set forth in claim 1, wherein, when the change of the zoom magnification from $Z_1$ to $Z_2$ is confirmed, the masking block is adjusted in terms of information on a size and position of the masking block according to equations of $$\frac{Z_2}{Z_1} \text{ and } P_2 = \frac{(Z_2 - Z_1)}{Z_1} \times (P_1 - P_C) + P_1,$$

and
where $P_1$ is a point in a monitor image with the zoom magnification of $Z_1$, and $P_2$ is a point in the monitor image with the zoom magnification of $Z_2$, corresponding to the point $P_1$, and $P_c$ is a center point of the monitor image.

8. The method as set forth in claim 1, further comprising:
(d) increasing the zoom magnification of the monitoring camera by a certain ratio under a state in which the masking block is set to hide an entire image of a subject placed on a center of the monitor image and confirming whether the center axis of the CCD of the monitoring camera is coincident with the optical axis of the lens of the monitoring camera by confirming whether the masking block adjusted to correspond to the increase of the zoom magnification hides the entire image of the subject enlarged by the increase of the zoom magnification; and
(e) when it is confirmed that the center axis of the CCD of the monitoring camera is not coincident with the optical axis of the lens of the monitoring camera, setting a new masking block to hide the entire image of the subject enlarged by the increase of the zoom magnification, and calculating and storing the interaxis offset based on a difference in position between the new masking block and the masking block with the size adjusted in step (d), wherein (c) and (d) are performed before (a).

9. The method as set forth in claim 8, wherein the interaxis offset ($P_{off}$) calculated in (d) is obtained by:

$$P_{Off} = \frac{(P_{M2} - P_{M1})}{(Z_2/Z_1 - 1)},$$

and
a displacement of the masking block to be further moved in (c) is obtained by:

$(Z_2-Z_1)/Z_1 \times P_{off}$, where, $Z_1$ is a zoom magnification before change of the zoom magnification, and $Z_2$ is a current zoom magnification after change of the zoom magnification, $P_{M1}$ is a point of the masking block with the size adjusted in (d), and $P_{M2}$ is a point of the new masking block set in (e), corresponding to the $P_{M1}$.

10. The method as set forth in claim 1, wherein, when the change of the panning and/or tilting conditions is confirmed, the masking block is adjusted in terms of information on positions on an X axis and a Y axis, respectively, according to the following equations:

$$\frac{(Z_2 - Z_1)}{Z_1} \times P_{Off},$$

where, $P_1^X$ and $P_1^Y$ are positions on an X axis and a Y axis of points in the monitor image before panning and/or tilting, respectively,
$P_2^X$ and $P_2^Y$ are positions on an X axis and a Y axis of points in the monitor image after panning and/or tilting, respectively, corresponding to $P_1^X$ and $P_1^Y$,
$\alpha_X^T$ and $\alpha_Y^T$ are movement displacements in an X axis direction and a Y direction when the zoom magnification is 1 and a tilting angle is a degree of 1, respectively,
$\alpha_X^P$ and $\alpha_Y^P$ are movement displacements in an X axis direction and a Y direction when the zoom magnification is 1 and a panning angle is a degree of 1, respectively,
$A_1^T$ and $A_2^T$ are tilting angles before and after rotation, respectively, and
$A_1^P$ and $A_2^P$ are panning angles before and after rotation, and $Z_C$ is a current zoom magnification.

11. The method as set forth in claim 1, further comprising:
(f) further adjusting the masking block adjusted to correspond to the change of at least one of the panning and the tilting conditions in (b) by reflecting a pan/tilt offset occurring due to an incorrect mounting of the monitoring camera on a pan/tilter.

12. The method as set forth in claim 11, further comprising:
(g) rotating the monitoring camera in a panning or tilting direction by a certain angle under a state in which the masking block is set to hide an entire image of a subject in the monitor image and confirming whether the monitoring camera is correctly mounted on the pan/tilter by confirming whether the masking block with the position adjusted to correspond to the rotation of the monitoring camera hides the entire image of the subject moved by the rotation; and
(h) when it is confirmed that the monitoring camera is not correctly mounted on the pan/titer, setting a new masking block to hide the entire image of the subject moved by the rotation, and calculating and storing the pan/tilt offset based on a difference in position between the new masking block and the masking block with the position adjusted in (g),
wherein (g) and (h) ate performed before (a).

13. The method as set forth in claim 1, wherein, when the change of the zoom magnification and at least one of the panning and tilting condition is confirmed, the masking block is adjusted in terms of information on sizes and positions on an X axis and a Y axis, respectively, according to the following equations:

$$P_2^X = \frac{(Z_2 - Z_1)}{Z_1} \times (P_1^X - P_C^X) + \alpha_X^T \times (A_2^T - A_1^T) \times Z_2 + \alpha_X^P \times$$

$$(A_2^P - A_1^P) \times Z_2 + P_1^X$$

$$P_2^Y = \frac{(Z_2 - Z_1)}{Z_1} \times (P_1^Y - P_C^Y) + \alpha_Y^T \times (A_2^T - A_1^T) \times Z_2 + \alpha_Y^P \times$$

$$(A_2^P - A_1^P) \times Z_2 + P_1^Y, \text{ and } \frac{Z_2}{Z_1}$$

where, $P_1^X$ and $P_1^Y$ are positions on an X axis and a Y axis of points in the monitor image before changing, respectively,
$P_2^X$ and $P_2^Y$ are positions on an X axis and a Y axis of points in the monitor image after changing, respectively, corresponding to $P_1^X$ and $P_1^Y$,
$\alpha_X^T$ and $\alpha_Y^T$ are movement displacements in an X axis direction and a Y direction when the zoom magnification is 1 and a tilting angle is a degree of 1, respectively,
$\alpha_X^P$ and $\alpha_Y^P$ are movement displacements in an X axis direction and a Y direction when the zoom magnification is 1 and a panning angle is a degree of 1, respectively,
$A_1^T$ and $A_2^T$ are tilting angles before and after rotation, respectively,
$A_1^P$ and $A_2^P$ are panning angles before and after rotation, and
$Z_1$ is a zoom magnification before changing, and $Z_2$ is a current zoom magnification after changing.

14. The method as set forth in claim 10 or 13, wherein $\alpha_X^T$, $\alpha_Y^T$, $\alpha_X^P$ and $\alpha_Y^P$ are values calculated from a result of a test performed in advance and are stored in a memory in advance.

15. A method for controlling a masking block in a camera, comprising:
receiving monitoring camera control data; and adjusting a masking block based on an offset value and the control data, wherein the control data includes zoom, panning, and/or tilting commands of the camera and wherein the zoom command changes zoom magnification N times, the panning and tilting commands change a monitoring camera angle, and the offset value comprises a difference in position between the image of the subject and the masking block due to a discrepancy between a center axis of a CCD and an optical axis of a lens of the camera.

* * * * *